(12) United States Patent
Ma

(10) Patent No.: US 8,427,596 B2
(45) Date of Patent: Apr. 23, 2013

(54) TFT-LCD ARRAY SUBSTRATE AND DRIVING METHOD THEREOF

(75) Inventor: Zhanjie Ma, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 577 days.

(21) Appl. No.: 12/644,170

(22) Filed: Dec. 22, 2009

(65) Prior Publication Data

US 2010/0157189 A1    Jun. 24, 2010

(30) Foreign Application Priority Data

Dec. 24, 2008   (CN) .......................... 2008 1 0240968

(51) Int. Cl.
*G02F 1/136* (2006.01)
(52) U.S. Cl.
USPC ................ 349/48; 349/47; 345/208; 345/92; 345/84
(58) Field of Classification Search .................... 349/48, 349/46, 47; 345/100, 103
See application file for complete search history.

(56) References Cited

U.S. PATENT DOCUMENTS

| | | | |
|---|---|---|---|
| 6,380,919 B1 * | 4/2002 | Koyama et al. ................. | 345/92 |
| 6,545,653 B1 * | 4/2003 | Takahara et al. ................ | 345/87 |
| 6,545,655 B1 * | 4/2003 | Fujikawa ........................ | 345/87 |
| 2001/0015715 A1 * | 8/2001 | Hebiguchi et al. .............. | 345/92 |
| 2002/0024508 A1 * | 2/2002 | Nakamura et al. ............. | 345/204 |
| 2003/0043104 A1 * | 3/2003 | Lee et al. ......................... | 345/92 |
| 2006/0186913 A1 | 8/2006 | Kim | |
| 2006/0267889 A1 * | 11/2006 | Kimura ........................... | 345/84 |

FOREIGN PATENT DOCUMENTS

| | | |
|---|---|---|
| CN | 1825176 A | 8/2006 |
| CN | 1866340 A | 11/2006 |
| KR | 1020070041829 A | 4/2007 |

\* cited by examiner

*Primary Examiner* — Edward Glick
*Assistant Examiner* — Sang V Nguyen
(74) *Attorney, Agent, or Firm* — Ladas & Parry LLP

(57) ABSTRACT

The present invention relates to a TFT-LCD array substrate and a driving method thereof. The TFT-LCD array substrate comprises a substrate, on which pixel regions arranged in matrix are formed, a first pixel electrode and a first thin film transistor located in an odd column and a second pixel electrode and a second thin film transistor located in an even column are formed in each pixel region; a first gate line and a second gate line are formed in each pixel region, the first gate line is connected to gate of the first thin film transistor, and the second gate line is connected to gate of the second thin film transistor; one data line is formed in each pixel region, and the data line is connected to source of the first thin film transistor and source of the second thin film transistor, respectively. The present invention reduces the number of data lines and the number of data driving chips or the pins thereof, or, reduces the number of the gate lines and the number of scan driving chips or the pins thereof, and reduces the production cost of the TFT-LCD.

10 Claims, 3 Drawing Sheets

TFT-LCD ARRAY SUBSTRATE AND DRIVING METHOD THEREOF

TECHNICAL FIELD

The present invention relates to a liquid crystal display apparatus and a driving method thereof, and in particular relates to a TFT-LCD array substrate and a driving method thereof.

BACKGROUND

Thin Film Transistor Liquid Crystal Display (TFT-LCD) mainly comprises a liquid crystal display panel, a scan driving circuit and a data driving circuit, wherein the liquid crystal display panel comprises a color film substrate and an array substrate set for a cell, and a liquid crystal layer set between these two substrates, and the scan driving circuit and the data driving circuit connect to TFT switching elements on the array substrate, respectively.

In traditional TFT-LCD array substrates, one TFT switching element is controlled by one data line and one gate line, and a pixel electrode connected to the TFT switching element is driven by switching on or switching off the TFT switching element. While the array substrate operates, the data line transmits a video data signal in the data driving circuit to source of the TFT switching element and thus controls voltage of the pixel electrode; the scan line transmits a scan driving signal in the scan driving circuit to gate of the TFT switching element and thus controls on and off of the TFT switching element.

In the procedure of implementing the present invention, the inventor finds that in traditional TFT-LCD array substrates, the number or length of data lines and gate lines will be correspondingly increased along with the increasing of size and/or display resolution. Since the number of data lines is increased and the length of data lines is too long, display problems such as signal delay will be caused; if width of data lines is increased for reducing signal delay, aperture opening ratio of pixel regions will be decreased, and defects affecting display performance will easily be produced at boundaries of data lines.

SUMMARY

The first aspect of the present invention provides a TFT-LCD array substrate and a driving method thereof for reducing the number of data lines used in traditional TFT-LCD array substrates, thus reducing production cost of the TFT-LCD.

The second aspect of the present invention provides another TFT-LCD array substrate and a driving method thereof for reducing the number of gate lines used in traditional TFT-LCD array substrates, thus reducing production cost of the TFT-LCD.

The present invention provides a TFT-LCD array substrate comprising a substrate, on which pixel regions arranged in matrix are formed; a first pixel electrode and a first thin film transistor located in an odd column and a second pixel electrode and a second thin film transistor located in an even column are formed in each pixel region; drain of the first thin film transistor is connected to the first pixel electrode, and drain of the second thin film transistor is connected to the second pixel electrode.

A first gate line and a second gate line are formed in each pixel region, the first gate line is connected to gate of the first thin film transistor, and the second gate line is connected to gate of the second thin film transistor; one data line is formed in each pixel region, and the data line is connected to source of the first thin film transistor and source of the second thin film transistor, respectively.

On the basis of the above-described technical solution, a selection switching device can also be set on the substrate, for receiving a scan driving circuit signal, generating a row scan signal for one pixel row, and outputting the row scan signal to the first gate line and the second gate line in turn.

The present invention also provides a driving method of the above-described TFT-LCD array substrate, comprising:

Step 11 for generating a row scan signal for a pixel row;

Step 12 for outputting the row scan signal to a first gate line of the pixel row, the first gate line makes data lines output a first data signal to first pixel electrodes located in odd columns through first thin film transistor located in the odd columns;

Step 13 for outputting the row scan signal to a second gate line of the pixel row, the second gate line makes the data lines output a second data signal to second pixel electrodes located in even columns through second thin film transistors located in the even columns.

In the TFT-LCD array substrate of an embodiment of the present invention, every two pixel electrodes commonly use one data line, which reduces the number of data lines and the number of data driving chips or pins of the data driving chips, and thus facilitates reducing production cost of the TFT-LCD. Spaces saved due to the reducing of data lines can be used to increase width of the data line without affecting aperture opening ratio, so as to reduce signal delay; on the other hand, the spaces saved due to the reducing of data lines can also be used to improve the aperture opening ratio. Further, the present invention can also generate the row scan signal through the selection switching device, and in turn control the first pixel electrodes located in the odd columns and the second pixel electrodes located in the even columns in a same pixel row at different timings according to the row scan signal, so that the number of scan driving chips needed is half of the total number of gate lines. Therefore, while reducing the number of the data driving chips or the number of the pins of the data driving chips that the array substrate needs, the present invention does not increase the number of the scan driving chips or the number of the pins of the scan driving chips needed for the array substrate, and thus it facilitates further reducing the production cost of the TFT-LCD.

The present invention can also provide a TFT-LCD array substrate and a driving method thereof for reducing the number of gate lines and the number of scan driving chips or the number of pins of the scan driving chips while not increasing the number of data driving chips or the number of pins of the data driving chips.

The present invention provides another TFT-LCD array substrate comprising a substrate, on which pixel regions arranged in matrix are formed, wherein a first pixel electrode and a first thin film transistor located in an odd column and a second pixel electrode and a second thin film transistor located in an even column are formed in each pixel region, drain of the first thin film transistor is connected to the first pixel electrode, and drain of the second thin film transistor is connected to the second pixel electrode.

a first data line and a second data line are formed in each pixel region, the first data line is connected to source of the first thin film transistor, and the second data line is connected to source of the second thin film transistor; one gate line is formed in each pixel region, and the gate line is connected to gate of the first thin film transistor and gate of the second thin film transistor, respectively.

On the basis of the above-described technical solution, a selection switching device can also be set on the substrate, for receiving a data signal, generating a column data signal for a pixel column, and outputting the column data signal to the first data line and the second data line in turn.

The present invention also provides another driving method of the TFT-LCD array substrate comprising:

Step 21 or generating a column data signal for a pixel column;

Step 22 for outputting the column data signal to first data lines located in odd columns, and making first pixel electrodes located in the odd columns be charged through first thin film transistors located in the odd columns;

Step 23 for outputting the column data signal to second data lines located in even columns, and making second pixel electrodes located in the even columns be charged through second thin film transistors located in the even columns.

In the TFT-LCD array substrate of an embodiment of the present invention, every two pixel electrodes commonly use one gate line, which reduces the number of the gate lines and the number of scan driving chips or pins of the scan driving chips, and thus facilitates reducing production cost of the TFT-LCD. Spaces saved due to the reducing of the gate lines can be used to increase width of the gate line without affecting aperture opening ratio, so as to reduce signal delay; on the other hand, the spaces saved due to the reducing of the gate lines can also be used to improve the aperture opening ratio. Further, the present invention can also generate the column data signal through the selection switching device, and in turn control the first pixel electrodes located in the odd columns and the second pixel electrodes located in the even columns in a same pixel row at different timings according to the column data signal, so that the number of data driving chips needed to be used is half of the total number of data lines. Therefore, while reducing the number of the scan driving chips or the number of the pins of the scan driving chips that the array substrate needs, the present invention does not increase the number of the data driving chips or the number of the pins of the data driving chips needed for the array substrate, and thus it facilitates further reducing the production cost of the TFT-LCD.

DETAILED DESCRIPTION OF THE PREFERRED EMBODIMENTS

The technical solution of the present invention is further described in details through the drawings and embodiments.

Figure 1:
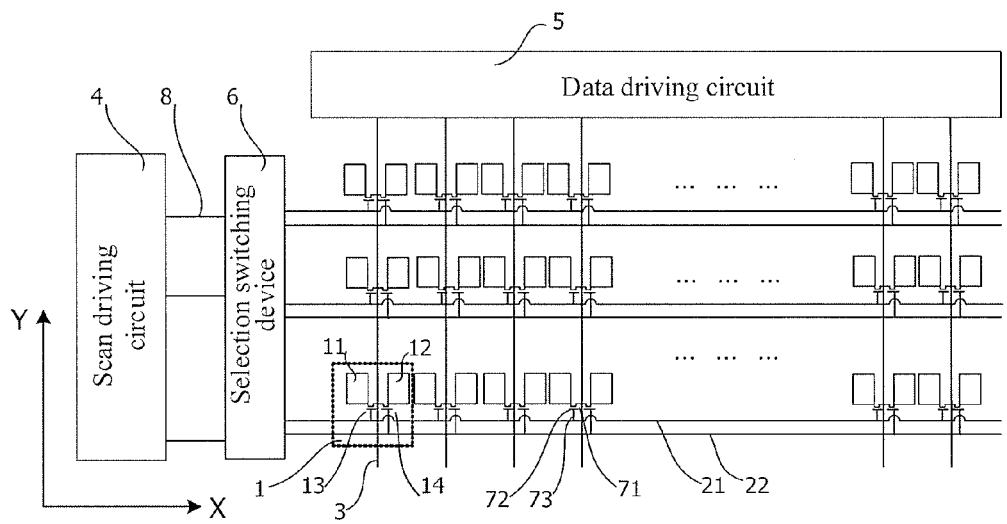
FIG. 1 is a structural schematic diagram of a first embodiment of a TFT-LCD array substrate of the present invention.

FIG. 1 is a structural schematic diagram of a first embodiment of a TFT-LCD array substrate of the present invention. As shown in FIG. 1, the TFT-LCD array substrate of the present invention comprises a substrate, on which a display region and a peripheral region outside the display region are formed; the display region consists of pixel regions arranged in matrix. Two pixel electrodes and two thin film transistors are formed in each pixel region; a selection switching device 6 is set in the peripheral region along a direction that gate lines extend (i.e., X direction as shown in FIG. 1), and the gate lines are connected to a scan driving circuit 4 through the selection switching device 6; a data driving circuit 5 is connected to the peripheral region along a direction that data lines 3 extend (i.e., Y direction as shown in FIG. 1), and data lines 3 are respectively connected to the data driving circuit 5.

The two pixel electrodes formed in each pixel region 1 are a first pixel electrode 11 located in an odd column and a second pixel electrode 12 located in an even column.

The two thin film transistors formed in each pixel region 1 are a first thin film transistor 13 located in the odd column and a second thin film transistor 14 located in the even column; each thin film transistor comprises source 71, drain 72, and gate 73; the drain 72 of the first thin film transistor 13 is connected to the first pixel electrode 11.

Each row of pixel regions 1 is connected to two gate lines and one data line. The two gate lines are a first gate line 21 and a second gate line 22; the first gate line 21 is connected to gate 73 of the first thin film transistor 13, and the second gate line 22 is connected to gate 73 of the second thin film transistor 14; the data line 3 is connected to source 71 of the first thin film transistor 13 and source 71 of the second thin film transistor 14.

The selection switching device 6 formed in the peripheral region is used to receive signals output from the scan driving circuit 4, then generate a row scan signal for a pixel row, and output the row scan signal to the first gate line 21 and the second gate line 22 in turn.

In a unit of pixel region 1 of the TFT-LCD array substrate, driving of the first pixel electrode 11 is controlled by the first thin film transistor 13, and driving of the second pixel electrode 12 is controlled by the second thin film transistor 14; the first thin film transistor 13 and the second thin film transistor 14 also commonly use one same data line 3.

Operation principles of the present embodiment are explained by taking scan of a row of pixel regions of the TFT-LCD array substrate as an example.

For example, the selection switching device 6 receives a signal output from the scan driving circuit 4 through a scan line 8 and generates a row scan signal for a pixel row. While driving a row of pixel regions 1, the selection switching device 6 performs control on the first pixel electrodes 11 located in the odd columns and the second pixel electrodes 12 located in the even columns in the pixel regions 1 of the row respectively.

A control process for the scan of the first pixel electrodes 11 performed by the selection switching device 6 comprises: the selection switching device 6 establishes communication connection between the first gate line 21 and the scan line 8; when the row scan signal is transmitted to the first gate line 21 through the selection switching device 6, the first thin film transistors 13 connected to the first gate line 21 are switched on; at this moment, a first data signal transmitted on the data lines 3 make the first pixel electrodes 11 be charged through the first thin film transistors 13; since there is no row scan signal on the second gate line 22, the second thin film transistors 14 connected to the second gate line 22 are switched off, and thus the second pixel electrodes 12 cannot be charged.

When charging of the first pixel electrodes 11 located in the odd columns in pixel regions 1 of the row is finished, the selection switching device 6 scans the second pixel electrodes 12 located in the even columns for the row of pixel regions 1, particularly comprising: the selection switching device 6 disconnects the communication connection between the first gate line 21 and the scan line 8, establishes communication connection between the second gate line 22 and the scan line 8, and transmits the row scan signal to the second gate line 22; the second thin film transistors 14 connected to the second gate line 22 are switched on; at this moment, a second data signal transmitted on the data lines 3 make the second pixel electrodes 12 be charged through the second thin film transistors 14; since the first gate line 21 does not have a scan signal, the first thin film transistors 13 connected to the first gate line 21 are switched off, and thus the first pixel electrodes 11 cannot be charged. When charging process of the second pixel electrodes 12 in pixel regions 1 of the row is completed, scan of a row of pixel regions is as well completed.

Afterwards, the scan driving circuit 4 will output a new signal, the selection switching device 6 generates a row scan signal for another pixel row according to that new signal, and scan a next row of pixel regions 1 by this row scan signal. Scan manner may be progressive scan or interlaced scan, and the above-described method can be adopted to perform control on the scan of each row of pixel regions.

Every two pixel electrodes of the TFT-LCD array substrate of the present embodiment commonly use one data line, which reduces the number of data lines and the number of data driving chips or pins of the data driving chips, and facilitates reducing production cost of the TFT-LCD. Spaces saved due to the reducing of data lines can be used to increase width of the data line without affecting aperture opening ratio, so as to reduce signal delay; on the other hand, the spaces saved due to the reducing of data lines can also be used to improve the aperture opening ratio. Meanwhile, the present invention adds one selection switching device at a connection between the scan driving circuit and the pixel region, for generating the row scan signal and outputting it to the first gate line and the second gate line in turn. Such a design can make the total number of gate lines needed to be used in the present embodiment (sum of the number of the first gate lines and the number of the second gate lines) twice of the number of the scan lines in the peripheral region; one selection switching unit in the selection switching device can control two gate lines in the display region through one scan line in the peripheral region, and can thus drive the first pixel electrode located in the odd column or the second pixel electrode located in the even column in the pixel region, respectively. Therefore, while reducing the number of the data driving chips or the number of the pins of the data driving chips needed to be used by the array substrate, the present embodiment does not increase the number of the scan driving chips or the number of the pins of the scan driving chips needed to be used by the array substrate.

In addition, since the selection switching device can be directly formed in the peripheral region of the array substrate during the preparation process of the array substrate by adopting existing TFT composing technologies, additional cost for preparing the selection switching device will not be increased, and thus it facilitates reducing the production cost of the TFT-LCD. Further, the scan driving circuit can be formed by selecting one or more scan driving chips to adhere to the peripheral region of the array substrate. Further, the scan driving circuit can be directly formed in the peripheral region of the array substrate by adopting existing TFT composing technologies, and thus facilitating further reducing the production cost of the TFT-LCD.

It can be understood by those skilled in the art that in the above-described technical solution, if it is the case that each pixel region sets two data lines and two pixel electrodes commonly use one gate line, the selection switching device can also be formed in the peripheral region along the direction that data lines extend (i.e., the Y direction as shown in FIG. 1), for receiving a signal output by the data driving circuit, then generating a column data signal for the pixel column, and outputting the data signal to the first data line located in the odd column and the second data line located in the even column in turn, so that the pixel region connected to the first data line and the pixel region connected to the second data line alternately obtain the data signal at different timings and are thus charged.

Another TFT-LCD array substrate provided by the present invention comprises a substrate, on which pixel regions arranged in matrix are formed, wherein a first pixel electrode and a first thin film transistor located in an odd column and a second pixel electrode and a second thin film transistor located in an even column are formed in each pixel region, drain of the first thin film transistor is connected to the first pixel electrode, and drain of the second thin film transistor is connected to the second pixel electrode. A first data line and a second data line are formed in each pixel region, the first data line is connected to source of the first thin film transistor, and the second data line is connected to source of the second thin film transistor; one gate line is formed in each pixel region, and the gate line is connected to gate of the first thin film transistor and gate of the second thin film transistor, respectively; a selection switching device is also be set on the substrate, for generating a column data signal for a pixel column and outputting the column data signal to the first data line and the second data line in turn.

Since the selection switching device has been set in the present embodiment, the number of the scan driving chips or the number of the pins of the scan driving chips needed to be used by the array substrate can be reduced to half of that when the selection switching device is not set, and the number of the data driving chips or the number of the pins of the data driving chips will not be increased, thus facilitating reducing the production cost of the TFT-LCD.

Figure 2:
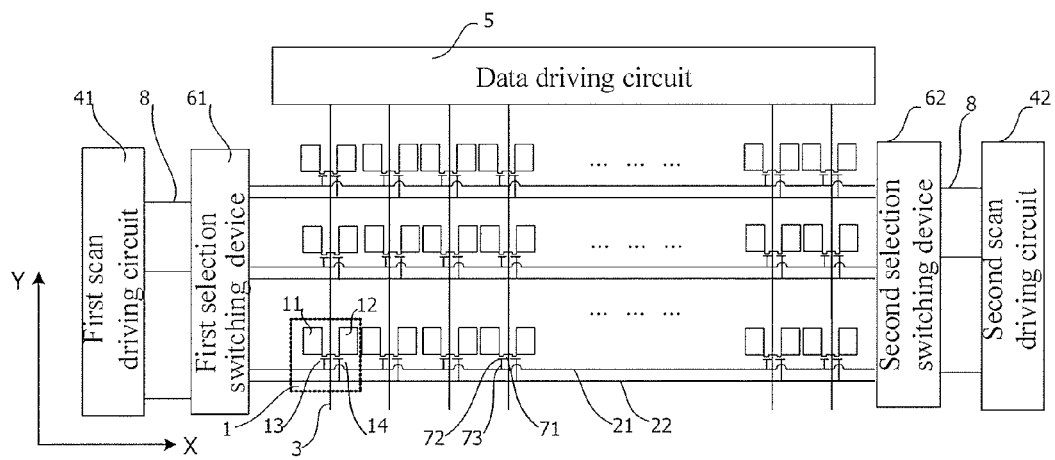
FIG. 2 is a structural schematic diagram of a second embodiment of a TFT-LCD array substrate of the present invention.

FIG. 2 is a structural schematic diagram of a second embodiment of a TFT-LCD array substrate of the present invention. The difference between the present embodiment and the embodiment illustrated in FIG. 1 lies in that in the present embodiment, peripheral regions on the left side and the right side of the display region each has one selection switching device and one scan driving circuit, and each scan driving circuit is connected to gate lines of the display region through a selection switching device. As shown in FIG. 2, a first scan driving circuit 41 is set in the peripheral region on the left side of the display region, the first scan driving circuit 41 is connected to a first selection switching device 61, and the first selection switching device 61 is connected to one end of a first gate line 21 and one end of a second gate line 22 for generating a row scan signal for a pixel row from the one end of the first gate line 21 and the one end of the second gate line 22 according to signals received from the first scan driving circuit 41 and transmitting the row scan signal to the first gate line 21 and the second gate line 22 in turn. A second scan driving circuit 42 is set in the peripheral region on the right side of the display region, the second scan driving circuit 42 is connected to a second selection switching device 62, and the second selection switching device 62 is connected to the other end of the first gate line 21 and the other end of the second gate line 22 for generating a row scan signal for the scan row from the other end of the first gate line 21 and the other end of the second gate line 22 according to signals output by the second scan driving circuit 42 and transmitting the row scan signal to the first gate line 21 and the second gate line 22 in turn.

The present embodiment adopts two scan driving circuits to drive pixels in the same row synchronously through respectively connected selection switching devices, so that first pixel electrodes located in odd columns and second pixel electrodes located in even columns in the same row of pixels are charged in turn. In particular, the first scan driving circuit 41 and the first selection switching device 61 located on the left side of the display region and the second scan driving circuit 42 and the second selection switching device 62 located on the right side of the display region switch on in turn first thin film transistors 13 located in odd columns and second thin film transistors 14 located in even columns in pixel regions 1 in the same row by adopting a synchronous manner.

Operation principles of the present embodiment are explained by taking scan of one row of pixel regions of the TFT-LCD array substrate as an example.

The first scan driving circuit 41 outputs a signal to the first selection switching device 61, and then the first switching device 61 generates a row scan signal for a pixel row. The first selection switching device 61 establishes communication connection between the first gate line 21 and a scan line 8, and transmits the row scan signal to the first gate line 21; the first thin film transistors 13 connected to the first gate line 21 are switched on in turn from left to right, and a first data signal transmitted on data lines 3 makes the first pixel electrodes 11 be charged in turn from left to right through the first thin film transistors 13. Since there is no scan signal on the second gate line 22, the second thin film transistors 14 connected to the second gate line 22 are switched off, and thus the second pixel electrodes 12 cannot be charged. At the same time, the second scan driving circuit 42 outputs a signal to the second selection switching device 62, and then the second switching device 62 generates a scan signal for the pixel row. The second selection switching device 62 establishes communication connection between the first gate line 21 and a scan line 8, and transmits the row scan signal to the first gate line 21; the first thin film transistors 13 connected to the first gate line 21 are switched on in turn from right to left, and the first data signal transmitted on data lines 3 makes the first pixel electrodes 11 be charged in turn from right to left through the first thin film transistors 13. Since there is no scan signal on the second gate line 22, the second thin film transistors 14 connected to the second gate line 22 are switched off, and thus the second pixel electrodes 12 cannot be charged.

After the charging of the first pixel electrodes 11 located in the odd columns in the row of pixel regions is completed, the first selection switching device 61 and the second selection switching device 62 synchronously disconnect the communication connection between the first gate line 21 and the scan lines 8, establish communication connection between the second gate line 22 and the scan lines 8, and transmit the row scan signal to the second gate line 22; the second thin film transistors 14 connected to the second gate line 22 are switched on in turn from left to right and simultaneously switched on in turn from right to left (i.e. said second thin film transistors 14 are switched on in turn from both left and right ends to the center at the same time); at this moment, a second data signal transmitted on the data line 3 makes the second pixel electrodes 12 be charged in turn from left to right and simultaneously charged in turn from right to left through the second thin film transistors 14. When the charging process of the second pixel electrodes 12 in the row of pixel regions 1 is completed, scan of one row of pixel regions is as well completed.

Afterwards, the first scan driving circuit 41 and the second scan driving circuit 42 will output new signals synchronously, and bidirectionally and synchronously scan a next row of pixels by adopting the above-described method through the first selection switching device 61 and the second selection switching device 62 respectively.

The present embodiment drives the array substrate in manner of bidirectional and synchronous scan, and thus Gate Line Delay of the scan signal in gate line transmission process can be reduced. Therefore, width of the gate line can be reduced in process of preparing the TFT-LCD array substrate within a scope that allows achieving same Gate Line Delay to that of a unidirectional driving method, thus improving aperture opening ratio of pixels. Meanwhile, the driving manner of bidirectional and synchronous scan in the present embodiment can also increase scan speed and improve scan efficiency. Further, the present embodiment also facilitates improving convenience for detecting defects of gate line breakage. For the convenience of comparing with the prior art, it is assumed that a breakpoint defect occurs in one gate line of two gate lines (i.e., the first gate line and the second gate line) in one pixel region (for example, a failure occurs in the third thin film transistor from left to right, i.e., the thin film transistor in a second odd column). If the array substrate is driven by adopting the prior art with unidirectional driving, since the failure occurs in the third thin film transistor, the third pixel electrode cannot be displayed. In addition, since all thin film transistors on the right side of the third thin film transistor connected to the gate line cannot receive the row scan signal, it is rendered that all pixel regions on the right side of the third pixel electrode cannot be displayed. Thus, affect on overall display of the TFT-LCD due to the failed point on the gate line is very obvious. What is different from the prior art is that the present embodiment adopts the bidirectional and synchronous driving manner; and if a failure occurs in the third thin film transistor, then all thin film transistors connected to the gate line on the right side of the third thin film transistor can obtain the row scan signal by driving in another direction, thus enabling normal display of respective pixel regions. In view of this, in the bidirectional and synchronous driving manner adopted by the present embodiment, if a breakpoint is very difficult to be restored, the breakpoint is not restored and thin film transistors on the left side and the right side of the breakpoint are synchronously driven from the left side and the right side, so that pixel electrodes located in the left side and the right side of the breakpoint are respectively charged. Therefore, the bidirectional and synchronous driving manner adopted in the present embodiment facilitates reducing affect on display due to breakpoint defects.

Figure 3:
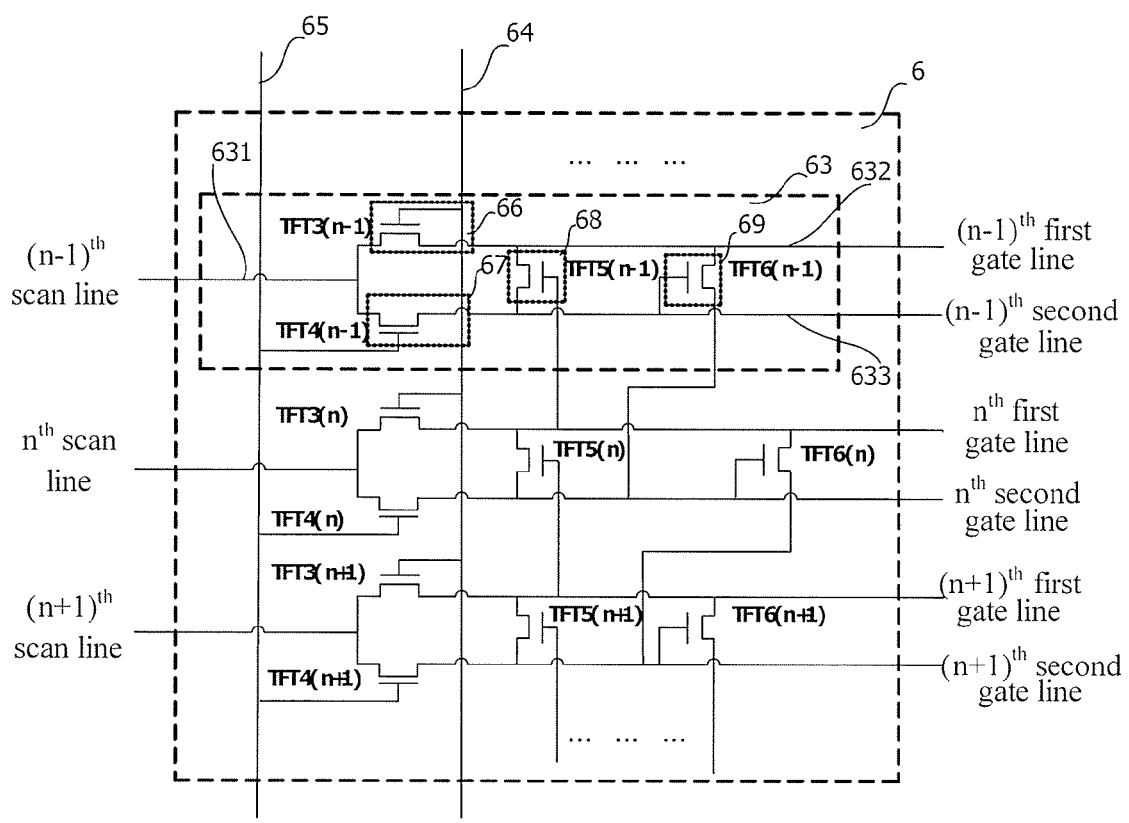
FIG. 3 is a structural schematic diagram of an embodiment of a selection switching device of the present invention.

FIG. 3 is a structural schematic diagram of an embodiment of a selection switching device of the present invention. The selection switching device of the present embodiment can be directly formed in the peripheral region of an underlaying substrate of the TFT-LCD array substrate by composing technologies while preparing the TFT-LCD array substrate. As shown in FIG. 3, the selection switching device 6 receives a signal output by the scan driving circuit and then generates a row scan signal. The selection switching device 6 has a matrix-type circuit structure, and comprises selection switching units 63 arranged in a plurality of rows, and a first gate line switching-on signal line 64 and a second gate line switching-on signal line 65 for receiving external clock signals; the number of the selection switching units 63 is identical with the number of rows of the pixel regions 1; each selection switching unit 63 comprises one input terminal 631, two output terminals (i.e., a first output terminal 632 and a second output terminal 633), and switches connected between the input terminal 631 and the output terminals. The input terminal 631 is connected to a row signal output terminal of the scan driving circuit, that is, the input terminal 631 is connected to a scan line, for receiving the signal output by the scan driving circuit. The first output terminal 632 is connected to the first gate line, and the second output terminal 633 is connected to the second gate line. The switches are formed between the input terminal 631 and the first output terminal 632 as well as the second output terminal 633, for switching on the first gate line and the second gate line in turn according to the clock signal, so that the row scan signal is output to the first gate line and the second gate line in turn. In particular, a first switch is formed between the input terminal 631 and the first output terminal 632, and the first switch is in particular a third thin film transistor 66; a second switch is formed between the input terminal 631 and the second output terminal 633, and the second switch is in particular a fourth thin film transistor 67.

Gate of the third thin film transistor 66 is connected to the first gate line switching-on signal line 64, and the input terminal 631 and the first output terminal 632 are bridged through source and drain of the third thin film transistor 66; gate of the fourth thin film transistor 67 is connected to the second gate line switching-on signal line 65, and the input terminal 631 and the second output terminal 633 are bridged through source and drain of the fourth thin film transistor 67. Particular implementation is for example that a connection point between the source of the third thin film transistor 66 and the source of the fourth thin film transistor 67 can be used as the input terminal 631 of the selection switching unit 63 and is connected to a scan signal output terminal of the scan driving circuit through a scan line; the drain of the third thin film transistor 66 can be used as the first output terminal 632 of the selection switching unit and is connected to the first gate line; the drain of the fourth thin film transistor 67 is used as the second output terminal 633 of the selection switching unit and is connected to the second gate line.

The signal output from the scan driving circuit is input through a scan line to the selection switching unit 63 connected to the scan line, and the external clock signal controls the first gate line switching-on signal line 64 and the second gate line switching-on signal line 65 to output high level signals alternately. For example:

When the external clock signal is at upper half edge, the clock signal switches on the first gate line switching-on signal line 64, so that the first gate line switching-on signal line 64 has a high level signal. At this moment, the gate of the third thin film transistor 66 connected to the first gate line switching-on signal line 64 has a gate switching-on signal, so that the third thin film transistor 66 is in a switching-on state; the row scan signal is transmitted to the first gate line via the first output terminal 632 through the third thin film transistor 66, and the first thin film transistor connected to the first gate line is switched on, so that the first pixel electrodes located in the odd columns in the pixels of a same row are charged. Since the second gate line switching-on signal line 65 has a low level signal at this moment, the fourth thin film transistor 67 connected to the second gate line switching-on signal line 65 is in a switching-off state, therefore there is no row scan signal on the second gate line.

When the external clock signal is inverted, i.e., the external clock is at lower half edge, the clock signal switches on the second gate line switching-on signal line 65, so that the second gate line switching-on signal line 65 has a high level signal. At this moment, the gate of the fourth thin film transistor 67 connected to the second gate line switching-on signal line 65 has a gate switching-on signal, so that the fourth thin film transistor 67 is in the switching-on state; the row scan signal is transmitted to the second gate line via the second output terminal 633 through the fourth thin film transistor 67, and the second thin film transistor connected to the second gate line is switched on, so that the second pixel electrodes located in the even columns in the pixels of a same row are charged. Since the first gate line switching-on signal line 64 has a low level signal at this moment, the third thin film transistor 66 connected to the first gate line switching-on signal line 64 is in the switching-off state, therefore there is no row scan signal on the first gate line.

The present embodiment transmits the row scan signal to the first gate line and the second gate line in turn at different timings through the selection switching unit, and implements, when scanning the pixels in a same row, driving the first pixel electrodes located in the odd columns and the second pixel electrodes located in the even columns in the pixels of the same row in turn at different timings. The number of scan lines connected to the scan driving circuit in the present embodiment is half of the number of the gate lines used by the display region, although a structure of the array substrate that two columns of pixel electrodes commonly use one data line increases the number of the gate lines used in the display region, the number of the scan lines for receiving output signals of the scan driving circuit is in fact not increased. Therefore, there is no need to increase the number of the scan driving chips used in the scan driving circuit, or increase the number of pins of the existing scan driving chips, thus facilitating reducing the production cost of the TFT-LCD.

On the basis of the above-described technical solution, a fifth thin film transistor 68 and a sixth thin film transistor 69 in which signals are cross-transmitted can be formed between two selection switching units 63. Source and drain of the fifth thin film transistor 68 are bridged with the first output terminal 632 and the second output terminal 633 of the present selection switching unit 63, and gate of the fifth thin film transistor 68 is connected to a first output terminal 632 of a selection switching unit 63 of a next row; source and drain of the sixth thin film transistor 69 are bridged with the first output terminal 632 of the present selection switching unit 63 and a second output terminal 633 of the selection switching unit of the next row, and gate of the sixth thin film transistor 69 is connected to the second output terminal 633 of the present selection switching unit 63.

For the sake of explanation, a scan line for driving the $n^{th}$ (n is an integer greater than 1) row of pixel regions in the TFT-LCD array substrate is referred to as a $n^{th}$ scan line; a first gate line of the $n^{th}$ row is referred to as a $n^{th}$ first gate line, and a second gate line of the $n^{th}$ row is referred to as a $n^{th}$ second gate line; the third thin film transistor, the fourth thin film transistor, the fifth thin film transistor, and the sixth thin film transistor included in the selection switching unit for controlling the $n^{th}$ first gate line and the $n^{th}$ second gate line at different timings are represented as TFT3($n$), TFT4($n$), TFT5($n$), and TFT6($n$) respectively. In the circuit structure as shown in FIG. 3, the row number n can be changed, but naming rules for respective elements in the row are the same as the above.

Operation principles of the selection switching device having the fifth thin film transistor 68 and the sixth thin film transistor 69 set are explained in conjunction with FIG. 3.

A row scan signal generated by the selection switching device according the signal output by the scan driving circuit comprises a scan switching-on voltage signal Vgh and a scan switching-off voltage signal Vgl, wherein Vgh is a high voltage signal, and Vgl is a low voltage signal. It is assumed that the scan driving circuit adopts a progressive scan mode to output scan signals, that is, when a row scan line has the scan switching-on voltage signal Vgh, other row scan lines have the scan switching-off voltage signal Vgl.

When the row scan signal generated from the selection switching device is a scan signal for scanning a $(n-1)^{th}$ row of pixel electrodes, the $(n-1)^{th}$ row scan line has the scan switching-on voltage signal Vgh, and other row scan lines such as the $n^{th}$ scan line and the $(n+1)^{th}$ scan line have the scan switching-off voltage signal Vg1. The scan signal for scanning the $(n-1)^{th}$ row of pixel electrodes is input to the selection switching device as shown in FIG. 3.

When high level is loaded to the first gate line switching-on signal line 64 in the selection switching device through the external clock signal, a low level is loaded to the second gate line switching-on signal line 65, and the TFT switching elements of the respective selection switching units (such as TFT3$(n-1)$, TFT3$(n)$, TFT3$(n+1)$, etc.) connected to the first gate line switching-on signal line 64 are all in a switching-on state since the gates have the high voltage signal. When the $(n-1)^{th}$ scan line transmits the scan switching-on voltage signal Vgh to the first gate line of the $(n-1)^{th}$ row through TFT3$(n-1)$, then the first thin film transistors of the $(n-1)^{th}$ row are switched on for controlling the first pixel electrodes located in the odd columns in the $(n-1)^{th}$ row of pixel regions to be charged. At this time, the $n^{th}$ scan line, the $(n+1)^{th}$ scan line, etc. have the scan switching-off voltage signal Vg1, which is transmitted to the $n^{th}$ first gate line, the $(n+1)^{th}$ first gate line, etc. through the TFT switching elements such as TFT3$(n)$, TFT3$(n+1)$, etc. connected to the first gate line switching-on signal line 64.

When high level is loaded to the second gate line switching-on signal line 65 in the selection switching device through the external clock signal, a low level is loaded to the first gate line switching-on signal line 64, and the TFT switching elements of the respective selection switching units (such as TFT4$(n-1)$, TFT4$(n)$, TFT4$(n+1)$, etc.) connected to the second gate line switching-on signal line 65 are all in the switching-on state. When the $(n-1)^{th}$ scan line transmits the scan switching-on voltage signal Vgh to the second gate line of the $(n-1)^{th}$ row through TFT4$(n-1)$, then the second thin film transistors of the $(n-1)^{th}$ row are switched on for controlling the second pixel electrodes located in the even columns in the $(n-1)^{th}$ row of pixel regions to be charged. At this time, the $n^{th}$ scan line, the $(n+1)^{th}$ scan line, etc. have the scan switching-off voltage signal Vg1, which is transmitted to the $n^{th}$ second gate line, the $(n+1)^{th}$ second gate line, etc. through the TFT switching elements such as TFT4$(n)$, TFT4$(n+1)$, etc. connected to the second gate line switching-on signal line 65.

Meanwhile, the scan switching-off voltage signal Vg1 of the $n^{th}$ scan line is transmitted to the $(n-1)^{th}$ first gate line through TFT6$(n-1)$ for quickly changing a voltage signal on the $(n-1)^{th}$ first gate line to the Vg1 signal, so that pixel electrodes connected to the $(n-1)^{th}$ first gate line are in a good hold state. In particular, when high level is loaded to the second gate line switching-on signal line 65 in the selection switching device through the external clock signal, the Vgh signal input by the $(n-1)^{th}$ scan line is transmitted to the $(n-1)^{th}$ second gate line through TFT4$(n-1)$, and thus gate terminal of TFT6$(n-1)$ has a high voltage signal; the Vg1 signal input by the $n^{th}$ scan line will firstly be transmitted to the $n^{th}$ second gate line through TFT4$(n)$, and then the Vg1 signal on the $n^{th}$ second gate line will be transmitted to the $(n-1)^{th}$ first gate line through the switched-on TFT6$(n-1)$ for quickly changing the voltage signal on the $(n-1)^{th}$ first gate line to the Vg1 signal, so that the first pixel electrode connected to the $(n-1)^{th}$ first gate line is in the good hold state. In short, while high level is output on the $(n-1)^{th}$ second gate line, that is, while respective gates corresponding to the second pixel electrodes of the even columns in the $(n-1)^{th}$ row are switched on, the low level is quickly output on the $(n-1)^{th}$ first gate line, that is, respective gates corresponding to the first pixel electrodes of the odd columns in the $(n-1)^{th}$ row are quickly switched off.

After completing the driving of the pixel electrodes of the $(n-1)^{th}$ row through the above-described process, the scan driving circuit outputs a signal for driving pixel electrodes in the $n^{th}$ row, and the selection switching device generates the row scan signal for the $n^{th}$ row. The scan switching-on voltage signal Vgh is input to the selection switching device through the $n^{th}$ scan line, and the selection switching device switches off the second gate line switching-on signal and switches on the first gate line switching-on signal through a signal controlled by the clock, and loads high level to the first gate line switching-on signal line 64. Thus, the Vgh signal on the $n^{th}$ scan line is transmitted to the $n^{th}$ first gate line through TFT3$(n)$, and the first thin film transistor connected to the $n^{th}$ first gate line is switched on, so that the first pixel electrodes located in the odd columns in the pixels of a same row are charged. Meanwhile, TFT is in the switching-on state since its gate has high level, and the $(n-1)^{th}$ scan line transmits the Vg1 signal to the $(n-1)^{th}$ second gate line through the switched-on TFT5$(n-1)$ for quickly changing the voltage signal on the $(n-1)^{th}$ second gate line into the Vg1 signal, so that the pixel electrodes connected to the $(n-1)^{th}$ second gate line are in the good hold state. Scan control principles for pixel electrodes of other rows are the same to the above. In short, while high level is output on the $n^{th}$ first gate line, that is, while respective gates corresponding to the first pixel electrodes of the odd columns in the $n^{th}$ row are switched on, the low level is quickly output on the $(n-1)^{th}$ second gate line, that is, respective gates corresponding to the second pixel electrodes of the even columns in the $(n-1)^{th}$ row are quickly switched off.

The present embodiment enables the first output terminal or the second output terminal in the selection switching device formerly in high level to quickly change the loaded voltage to low level when the external clock signal is inverted, which removes high voltage residue on the first gate line or the second gate line and makes corresponding gate be quickly switched off, so that corresponding pixel electrodes are in the good hold state, facilitating reducing flicker of the array substrate occurred during the display process.

Figure 4:
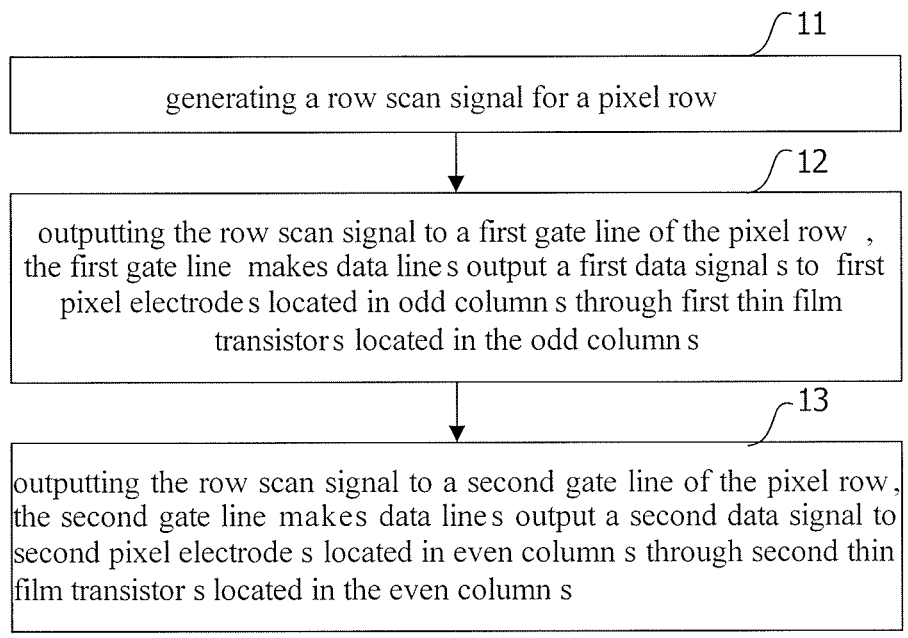
FIG. 4 is a flow diagram of a driving method of a TFT-LCD array substrate of the present invention.

FIG. 4 is a flow diagram of a driving method of a TFT-LCD array substrate of the present invention. As shown in FIG. 4, the present embodiment comprises:

Step 11 for generating a row scan signal for a pixel row;

Step 12 for outputting the row scan signal to a first gate line of the pixel row, the first gate line makes data lines output a first data signal to first pixel electrodes located in odd columns through first thin film transistor located in the odd columns;

Step 13 for outputting the row scan signal to a second gate line of the pixel row, the second gate line makes the data lines output a second data signal to second pixel electrodes located in even columns through second thin film transistors located in the even columns.

In the above-described driving method, the row scan signal for the pixel row can be generated and output to the first gate line and the second gate line in turn by the selection switching device after receiving the signal of the scan driving circuit.

In the above-described technical solution, both ends of the first gate line and the second gate line can be connected to one selection switching device respectively, for implementing bidirectional and synchronous driving of the array substrate. For example, one end of the first gate line and the second gate line is connected to a first selection switching device, and the other end of the first gate line and the second gate line is connected to a second selection switching device, thus:

Step 11 is particularly step 11', wherein the first selection switching device and the second selection switching device simultaneously generate the row scan signal for the pixel row.

Step 12 is particularly step 12', wherein the first selection switching device outputs the row scan signal to the first gate line of the pixel row from one end of the first gate line, the second selection switching device outputs the row scan signal to the first gate line of the pixel row from the other end of the first gate line, and the first gate line makes data lines output the first data signal to the first pixel electrodes located in odd columns through the first thin film transistors located in the odd columns;

Step 13 is particularly step 13', wherein the first selection switching device outputs the row scan signal to the second gate line of the pixel row from the one end of the second gate line, the second selection switching device outputs the row scan signal to the second gate line of the pixel row from the other end of the second gate line, and the second gate line makes the data lines output the second data signal to the second pixel electrodes located in the even columns through the second thin film transistors located in the even columns.

The present embodiment generates a row scan signal by a selection switching device, reduces the number of data lines and the number of data driving chips or pins of the data driving chips, controls first pixel electrodes located in odd columns and second pixel electrodes located in even columns in pixels of a same row at different timings according to the row scan signal, so that the number of scan driving chips needed to be used is half of the total number of gate lines. Therefore, while reducing the number of data lines and the number of the data driving chips or the pins of the data driving chips, the present invention does not increase the number of the scan driving chips or the number of the pins of the scan driving chips needed to be used by the array substrate. In addition, since the selection switching device can be directly formed in the peripheral region of the array substrate during the process of preparing the array substrate by adopting existing TFT composing technologies, additional cost for preparing the selection switching device will not be increased, and facilitating reducing the production cost of the TFT-LCD.

It is understood by those skilled in the art that in the above-described technical solution, if it is the case that each pixel region sets two data lines and two pixel electrodes commonly use one gate line, the selection switching device can also be formed in the peripheral region along the direction that data lines extend (i.e., the Y direction as shown in FIG. 1), for receiving the data signal output by the data driving circuit, then generating the column data signal, and outputting the column data signal to the first data line located in the odd column and the second data line located in the even column in turn, so that the pixel region connected to the first data line and the pixel region connected to the second data line alternately obtain the column data signal at different timings and are thus charged.

Figure 5:
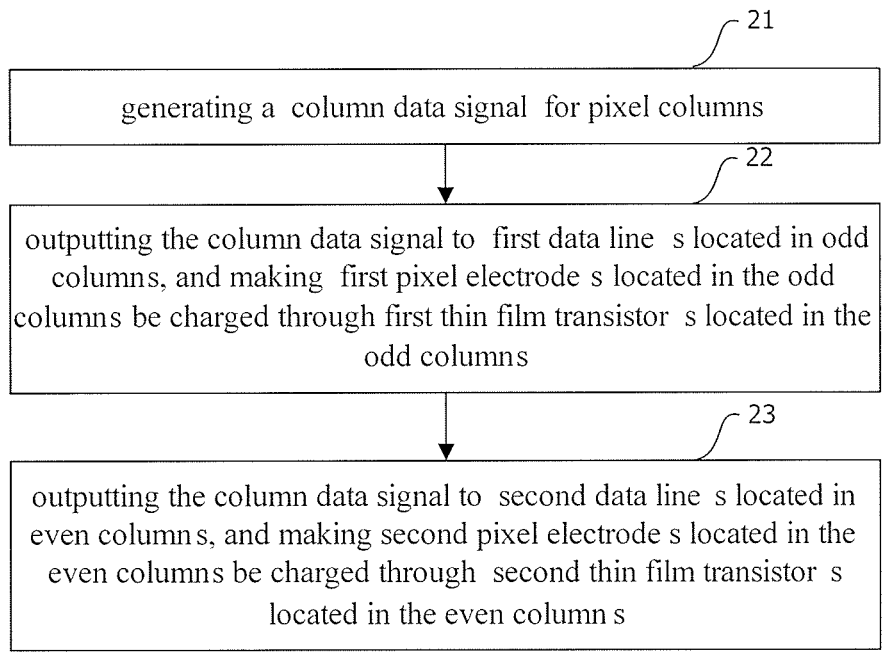
FIG. 5 is a flow diagram of another driving method of a TFT-LCD array substrate of the present invention.

FIG. 5 is a flow diagram of another driving method of a TFT-LCD array substrate of the present invention. As shown in FIG. 5, the present embodiment comprises:

Step 21 for generating a column data signal for a pixel column;

Step 22 for outputting the column data signal to first data lines located in odd columns, and making first pixel electrodes located in the odd columns be charged through first thin film transistors located in the odd columns;

Step 23 for outputting the column data signal to second data lines located in even columns, and making second pixel electrodes located in the even columns be charged through second thin film transistors located in the even columns.

In the above-described driving method, the column data signal for the pixel column can be generated and output to the first data line and the second data line in turn by the selection switching device after receiving the signal of the data driving circuit.

Since the selection switching device is set in the present embodiment, the number of the scan driving chips or the number of the pins of the scan driving chips needed to be used by the array substrate can be reduced to half of that when the selection switching device is not set, and the number of the data driving chips or the number of the pins of the data driving chips will not be increased, thus facilitating reducing the production cost of the TFT-LCD.

Finally, it should be understood that the embodiments above are only used to explain but not to limit the technical solutions of the present invention. Although the present invention has been explained in details with reference to the aforesaid embodiments, it is understood by those of ordinary skills in the art that modifications can still be made to the technical solutions disclosed in the foresaid embodiments, or equivalent replacements can be made to a part of technical features therein; and these modifications or replacements should not make nature of corresponding technical solutions depart from spirits and scopes of the technical solutions of embodiments of the present invention.

What is claimed is:

1. A TFT-LCD array substrate, comprising a substrate, on which pixel regions arranged in matrix are formed, wherein a first pixel electrode and a first thin film transistor located in an odd column and a second pixel electrode and a second thin film transistor located in an even column are formed in each pixel region, drain of the first thin film transistor is connected to the first pixel electrode, and drain of the second thin film transistor is connected to the second pixel electrode, wherein,
  a first gate line and a second gate line are formed in each pixel region, the first gate line is connected to gate of the first thin film transistor, and the second gate line is connected to gate of the second thin film transistor; one data line is formed in each pixel region, and the data line is connected to source of the first thin film transistor and source of the second thin film transistor, respectively,
  wherein, a selection switching device is further set on the substrate, for receiving a scan driving circuit signal, generating a row scan signal, and outputting the row scan signal to the first gate line and the second gate line in turn, and
  wherein, the selection switching device comprises a first selection switching device located at one end of the first gate line and the second gate line, which transmits the row scan signal to the first gate line and the second gate line in turn; and a second selection switching device located at the other end of the first gate line and the second gate line, which transmits the row scan signal to the first gate line and the second gate line in turn.

2. The TFT-LCD array substrate according to claim 1, wherein, the selection switching device comprises selection switching units having a same number to the number of rows of the pixel region, and each selection switching unit comprises one input terminal, two output terminals, and switches connected between the input terminal and the output terminals; the input terminal is used to receive the scan driving circuit signal, the first output terminal is connected to the first gate line, and the second output terminal is connected to the second gate line; the switches are used to switch on the first gate line and the second gate line in turn according to a clock signal, so that the row scan signal is output to the first gate line and the second gate line in turn.

3. The TFT-LCD array substrate according to claim 2, wherein,
the switch comprises a third thin film transistor and a fourth thin film transistor; a connection point between source of the third thin film transistor and source of the fourth thin film transistor is used as the input terminal of the selection switching unit; drain of the third thin film transistor is used as a first output terminal of the selection switching unit and is connected to the first gate line; drain of the fourth thin film transistor is used as a second output terminal of the selection switching unit and is connected to the second gate line;
the selection switching device further comprises a first gate line switching-on signal line connected to gate of the third thin film transistor, and a second gate line switching-on signal line connected to gate of the fourth thin film transistor, wherein the clock signal controls the first gate line switching-on signal line and the second gate line switching-on signal line to output high level signals alternately.

4. The TFT-LCD array substrate according to claim 3, wherein, each selection switching unit further comprises a fifth thin film transistor and a sixth thin film transistor;
source and drain of the fifth thin film transistor are bridged with the first output terminal and the second output terminal of the present selection switching unit, and gate of the fifth thin film transistor is connected to a first output terminal of a selection switching unit in a next row;
source and drain of the sixth thin film transistor are bridged with the first output terminal of the present selection switching unit and a second output terminal of the selection switching unit in the next row, and gate of the sixth thin film transistor is connected to the second output terminal of the present selection switching unit.

5. The TFT-LCD array substrate according to claim 1, wherein, it further comprises a scan driving circuit for outputting a signal to the selection switching device.

6. The TFT-LCD array substrate according to claim 5, wherein,
the selection switching device comprises a first selection switching device located at one end of the first gate line and the second gate line, which transmits the row scan signal to the first gate line and the second gate line in turn; and a second selection switching device located at the other end of the first gate line and the second gate line, which transmits the row scan signal to the first gate line and the second gate line in turn;
the scan driving circuit comprises a first scan driving circuit for outputting a signal to the first selection switching device and a second scan driving circuit for outputting a signal to the second selection switching device.

7. A TFT-LCD array substrate, comprising a substrate, on which pixel regions arranged in matrix are formed, wherein a first pixel electrode and a first thin film transistor located in an odd column and a second pixel electrode and a second thin film transistor located in an even column are formed in each pixel region, drain of the first thin film transistor is connected to the first pixel electrode, and drain of the second thin film transistor is connected to the second pixel electrode, wherein,
a first gate line and a second gate line are formed in each pixel region, the first gate line is connected to gate of the first thin film transistor, and the second gate line is connected to gate of the second thin film transistor; one data line is formed in each pixel region, and the data line is connected to source of the first thin film transistor and source of the second thin film transistor, respectively,
wherein a selection switching device is further set on the substrate, for receiving a scan driving circuit signal, generating a row scan signal, and outputting the row scan signal to the first gate line and the second gate line in turn,
wherein the selection switching device comprises selection switching units having a same number to the number of rows of the pixel region, and each selection switching unit comprises one input terminal, two output terminals, and switches connected between the input terminal and the output terminals; the input terminal is used to receive the scan driving circuit signal, the first output terminal is connected to the first gate line, and the second output terminal is connected to the second gate line; the switches are used to switch on the first gate line and the second gate line in turn according to a clock signal, so that the row scan signal is output to the first gate line and the second gate line in turn,
wherein the switch comprises a third thin film transistor and a fourth thin film transistor; a connection point between source of the third thin film transistor and source of the fourth thin film transistor is used as the input terminal of the selection switching unit; drain of the third thin film transistor is used as a first output terminal of the selection switching unit and is connected to the first gate line; drain of the fourth thin film transistor is used as a second output terminal of the selection switching unit and is connected to the second gate line;
the selection switching device further comprises a first gate line switching-on signal line connected to gate of the third thin film transistor, and a second gate line switching-on signal line connected to gate of the fourth thin film transistor, wherein the clock signal controls the first gate line switching-on signal line and the second gate line switching-on signal line to output high level signals alternately, and
wherein, each selection switching unit further comprises a fifth thin film transistor and a sixth thin film transistor;
source and drain of the fifth thin film transistor are bridged with the first output terminal and the second output terminal of the present selection switching unit, and gate of the fifth thin film transistor is connected to a first output terminal of a selection switching unit in a next row;
source and drain of the sixth thin film transistor are bridged with the first output terminal of the present selection switching unit and a second output terminal of the selection switching unit in the next row, and gate of the sixth thin film transistor is connected to the second output terminal of the present selection switching unit.

8. The TFT-LCD array substrate according to claim 7, wherein, the selection switching device comprises a first selection switching device located at one end of the first gate line and the second gate line, which transmits the row scan signal to the first gate line and the second gate line in turn; and a second selection switching device located at the other end of the first gate line and the second gate line, which transmits the row scan signal to the first gate line and the second gate line in turn.

9. The TFT-LCD array substrate according to claim 7, wherein, it further comprises a scan driving circuit for outputting a signal to the selection switching device.

10. The TFT-LCD array substrate according to claim 9, wherein,
the selection switching device comprises a first selection switching device located at one end of the first gate line and the second gate line, which transmits the row scan signal to the first gate line and the second gate line in turn; and a second selection switching device located at the other end of the first gate line and the second gate line, which transmits the row scan signal to the first gate line and the second gate line in turn;

the scan driving circuit comprises a first scan driving circuit for outputting a signal to the first selection switching device and a second scan driving circuit for outputting a signal to the second selection switching device.

* * * * *